(12) United States Patent
Chunchu et al.

(10) Patent No.: US 12,504,881 B2
(45) Date of Patent: Dec. 23, 2025

(54) RATE ADJUSTMENTS FOR A MEMORY INTERFACE

(71) Applicant: Micron Technology, Inc., Boise, ID (US)

(72) Inventors: Kondalarao Chunchu, Hyderabad (IN); Niraimathi N S, Hyderabad (IN); Sharath Chandra Ambula, Mancherial (IN); Shobhit Kumar Bhadani, Nawada (IN); Sushil Kumar, Hyderabad (IN); Vanaja Ambapuram, Hyderabad (IN); Venkata Kiran Kumar Matturi, Khammam (IN)

(73) Assignee: Micron Technology, Inc., Boise, ID (US)

( * ) Notice: Subject to any disclaimer, the term of this patent is extended or adjusted under 35 U.S.C. 154(b) by 145 days.

(21) Appl. No.: 17/889,660

(22) Filed: Aug. 17, 2022

(65) Prior Publication Data

US 2023/0074643 A1 Mar. 9, 2023

Related U.S. Application Data

(60) Provisional application No. 63/237,306, filed on Aug. 26, 2021.

(51) Int. Cl.
*G06F 3/06* (2006.01)
(52) U.S. Cl.
CPC .......... *G06F 3/0613* (2013.01); *G06F 3/0659* (2013.01); *G06F 3/0679* (2013.01)

(58) Field of Classification Search
CPC ............................ G06F 3/0613; G06F 3/0659
See application file for complete search history.

(56) References Cited

U.S. PATENT DOCUMENTS

| 2012/0159051 A1* | 6/2012 | Hida | G06F 12/0246 |
| | | | 711/E12.008 |
| 2017/0123728 A1* | 5/2017 | Rungta | G06F 3/0643 |
| 2020/0393981 A1* | 12/2020 | Dutta | G06N 20/00 |
| 2022/0019352 A1* | 1/2022 | Tripathi | G06F 3/0611 |

\* cited by examiner

*Primary Examiner* — Nicholas A. Paperno
(74) *Attorney, Agent, or Firm* — Holland & Hart LLP

(57) ABSTRACT

Methods, systems, and devices for rate adjustments for a memory interface are described. A host system may communicate with a memory system via an interface according to multiple data transfer rates. For example, the host system may configure the interface to operate according to a first rate. The host system may switch the interface from the first rate to a second rate in response to one or more commands from the host system satisfying one or more parameters such as a threshold quantity of data associated with a command, a threshold quantity of issued commands associated with at least the threshold quantity of data, a threshold quantity of issued and unexecuted commands, or any combination thereof. Based on the switching, the host system may communicate with the memory system via the interface in accordance with the second rate.

18 Claims, 5 Drawing Sheets

RATE ADJUSTMENTS FOR A MEMORY INTERFACE

CROSS REFERENCE

The present application for patent claims priority to U.S. Provisional Patent Application No. 63/237,306 by Chunchu et al., entitled "RATE ADJUSTMENTS FOR A MEMORY INTERFACE" and filed Aug. 26, 2021, which is assigned to the assignee hereof and is expressly incorporated by reference in its entirety herein.

FIELD OF TECHNOLOGY

The following relates generally to one or more systems for memory and more specifically to rate adjustments for a memory interface.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
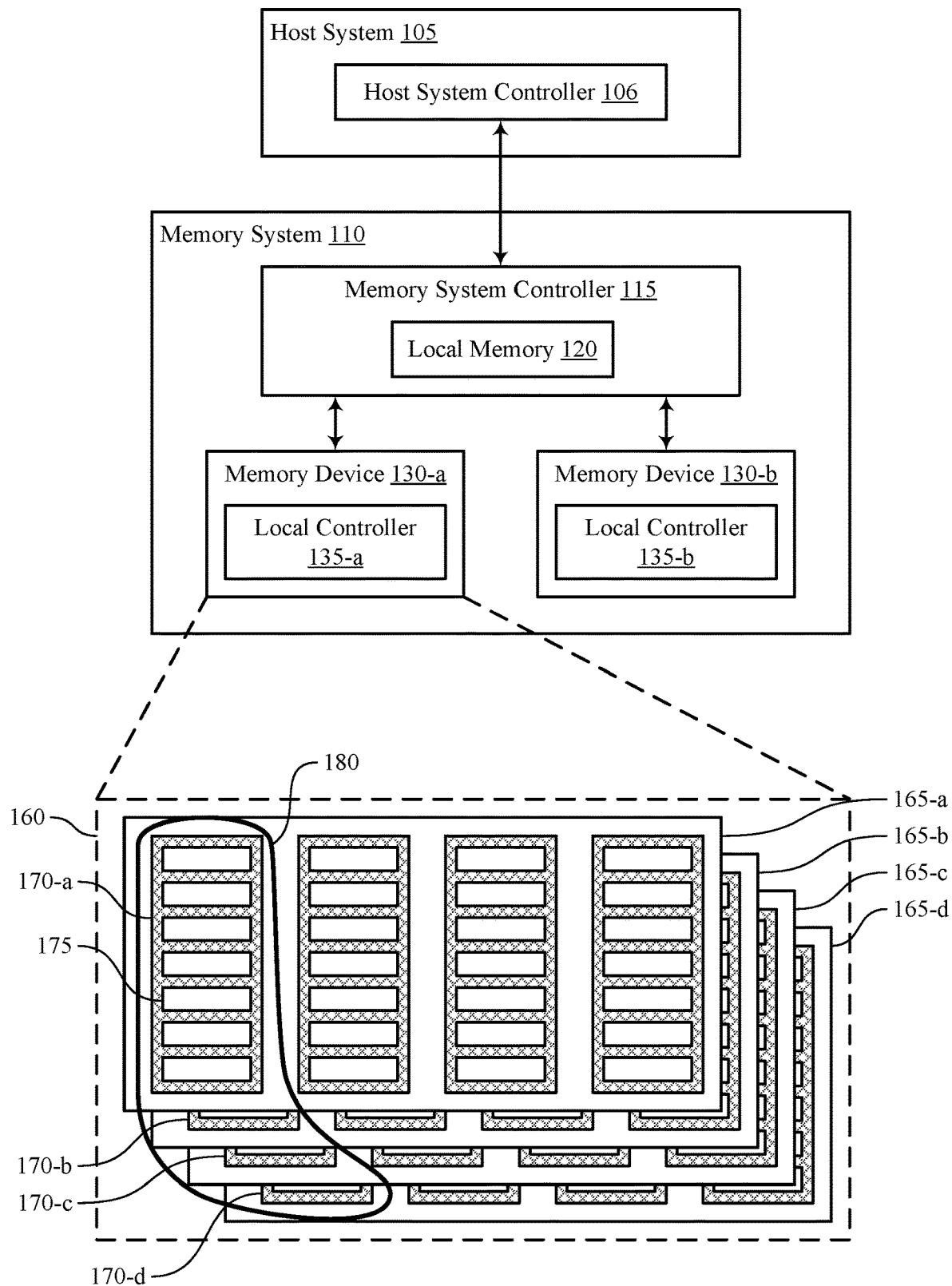
FIG. 1 illustrates an example of a system that supports rate adjustments for a memory interface in accordance with examples as disclosed herein.

A host system and a memory system may communicate via an interface (e.g., at the host system) according to various modes and data transfer rates. For example, the host system may configure the interface to operate according to a low-speed mode or a high-speed mode (e.g., a burst mode), possibly among other modes. The host system may additionally configure the interface to operate according to different data transfer rates within a mode. For instance, when operating in a given mode, the host system may set the interface to one of a set of gears (e.g., gear rates) associated with the mode, where each gear may correspond to a different data transfer rate. In some examples, the host system may set the gear of the interface based on a frequency at which the host system issues commands to the memory system (e.g., that cause data to be communicated via the interface such as read commands or write commands, among other commands). Accordingly, in some cases, the host system may set the interface to a relatively low gear (e.g., corresponding to a relatively low data transfer rate) if the host system issues commands relatively infrequently and may set the interface to a relatively high gear (e.g., corresponding to a relatively high data transfer rate) if the host system issues commands relatively frequently.

In some cases, however, setting the gear based on command frequency may decrease data rates, increase power consumption, or have one or more other drawbacks associated with performance of the host system and the memory system. For example, during video playback, a host system may issue commands read commands for a relatively large quantity of data (e.g., 512 kilobytes (KB) of data) relatively infrequently (e.g., approximately every 200 milliseconds) due to communicating the large quantity of data. Thus, in some cases, the host system may set the gear of the interface to a low gear based on the low frequency of issued commands, which may result in a slower transfer of the data compared to operating the interface according to a high gear, thereby increasing latency and reducing system performance. Additionally, in some cases, operating the interface at a low gear may increase power consumption by the host system (e.g., and the memory system). For example, a lower gear may correspond to a lower instantaneous power consumption than a higher gear, but the higher gear may support communicating data more quickly and thus an earlier deactivation of one or more components of the host system and/or the memory system. Thus, depending on differences in instantaneous power and durations for which various components are activated, among other factors, using a lower gear may in some cases actually lead to increased overall power consumption, along with longer data transfer times, compared to using a higher gear. Accordingly, in some cases, operating an interface at a higher gear, but for a shorter period of time, may reduce power consumption (e.g., despite the higher gear corresponding to an increased instantaneous power consumption during a period of data transfer).

Techniques, systems, and devices are described herein for gear management for communication interfaces that enables improved gear selection schemes. For example, a host system may configure an interface to operate according to a first gear (e.g., a first data transfer rate) and may communicate data with a memory system via the interface according to the first gear. The host system may adjust the gear of the interface in response to one or more commands from the host system satisfying one or more parameters of a set of parameters. For example, the host system may determine whether a size of a command (e.g., a quantity of data that is transferred based on the command) satisfies a threshold size. Additionally, or alternatively, the host system may determine whether at least a threshold quantity of commands within a set of tracked commands have at least the threshold size). Additionally, or alternatively, the host system may determine whether a queue depth (e.g., a quantity of issued and unexecuted commands) satisfies a threshold queue depth. If the host system determines that at least one of the parameters is satisfied (e.g., the size of the command satisfies the threshold size, at least the threshold quantity of commands have at least the threshold size, the queue depth satisfies the threshold queue depth) the host system may switch the interface to a second gear (e.g., a second data transfer rate) and may communicate data with the memory system according to the second gear. Alternatively, if the host system determines that each of the parameters fail to be satisfied, the host system may maintain the interface in the first gear. In some examples, the second gear may be higher than the first gear (e.g., correspond to a higher data transfer rate than the first gear).

These and other aspects described herein may result in reduced power consumption, reduced data transfer latencies, or other types of improved system performance. For example, at least some data transfers may be executed at higher rates with lower latency as compared to using other gear management techniques, which may further allow for earlier deactivation of various system components and thereby result in power savings.

Features of the disclosure are initially described in the context of a system with reference to FIG. 1. Features of the disclosure are described in the context of a process flow and parameter schemes with reference to FIGS. 2, 3A, and 3B. These and other features of the disclosure are further illustrated by and described in the context of an apparatus diagram and flowchart that relate to rate adjustments for a memory interface with reference to FIGS. 4 and 5.

FIG. 1 illustrates an example of a system 100 that supports rate adjustments for a memory interface in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 (e.g., via an interface) to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide-based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165 c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some examples, the host system 105 and the memory system 110 may communicate information (e.g., data, commands) via an interface such as a physical host interface. In some cases, the memory system controller 115 may communicate information with one or more of the memory devices 130 via an interface. A communication architecture of an interface may include multiple layers (e.g., layers of a protocol stack) over which information is communicated. For example, the communication architecture may include an application layer, a UFS transport protocol (UTP) layer, a Unipro protocol stack (e.g., that includes the UTP layer), and a physical layer (e.g., a UFS interconnect (UIC) layer, or a combination thereof, among other layers. In some examples, the application layer manages small computer system interface (SCSI) commands, task management functions such as command queue control, device power management operations, commands communicated with the physical layer, and query requests for modifying and/or retrieving configuration information associated with the host system 105 (e.g., or the memory system 110), among other commands and operations. In some cases, the Unipro protocol stack may be managed by a device management entity (DME). The DME may manage the communication of commands, operations, requests, etc. to the various layers of the communication architecture. For example, the DME may route commands received from higher layers (e.g., the application layer) to the physical layer and may route commands and data received at the physical layer to higher layers. In some examples, commands and data may be communicated between devices (e.g., between the host system 105 and the memory system 110, between the memory system controller 115 and a memory device 130) over the physical layer. In some cases, the physical layer may operate in accordance with an MPHY protocol.

In some examples, an interface may be operated according to various operating modes. For example, the interface may be operated in accordance with a low-speed mode and a high-speed mode. In some cases, the high-speed mode may correspond to an operating mode in which information is communicated in bursts of data (e.g., and may thus be referred to as a burst mode).

Within each operating mode, the interface may be operated according to different data transfer rates, which may be referred to as gears. For example, if operating in the low-speed mode, the interface may be operated according to one of a first set of gears associated with the low-speed mode. Additionally or alternatively, if operating in the burst mode, the interface may be operated according to one of a second set of gears associated with the burst mode. In some examples, a controller (e.g., a host system controller 106, a memory system controller 115) may change a gear of the interface. For example, different commands may be associated with different speed requirements. For instance, a command (e.g., a read command, a write command) associated with communicating video data may be associated with a different speed requirement than a command associated with communicating image data, among other examples. Accordingly, the controller may change the gear of the interface in order to satisfy the speed requirements associated with different commands. In some cases, the DME may support the controller changing (e.g., switching) the gear of the interface. For example, the Unipro stack may include one or more registers which may be read or written to via the DME, and a register of the one or more registers may store the current gear of the interface. Accordingly, the controller (e.g., via the DME) may determine the current gear of the interface by reading the register and may change the gear of the interface by writing a new gear to the register.

In some examples, the controller may set the gear of the interface based on a frequency at which the controller issues commands (e.g., based on a command density). In some cases, however, setting the gear based on command frequency may decrease data rates and performance of the host system 105 and the memory system 110. For example, during video playback, the controller may issue commands read commands for a relatively large quantity of data (e.g., 512 KB of data) relatively infrequently (e.g., approximately every 200 milliseconds) due to communicating the large quantity of data. As a result, the controller may set the gear of the interface to a low gear based on the low frequency of issued commands, thus slowing the transfer of data, increasing latency, and reducing system performance. Additionally, in some cases, operating the interface at a low gear may increase power consumption at the host system 105 (e.g., and the memory system 110). For example, a lower gear may correspond to a lower instantaneous power consumption than a higher gear, but the higher gear may support communicating data more quickly and thus an earlier deactivation of one or more components of the host system 105 and/or the memory system 110. Thus, using a lower gear may lead to increased overall power consumption and longer data transfer times compared to using a higher gear.

To reduce power consumption and increase system performance, a controller (e.g., a host system controller 106, a memory system controller 115) may support improved gear selection schemes. For example, the controller may configure an interface to operate according to a first gear and may communicate data with, for example, the memory system 110 via the interface according to the first gear. The controller may switch the gear of the interface in response to one or more commands from the controller satisfying one or more parameters of a set of parameters. For example, the controller may determine whether a size of a command satisfies a threshold size, whether a queue depth satisfies a threshold queue depth, whether at least a threshold quantity of commands within a set of tracked commands have at least the threshold size, or a combination thereof. If the controller determines that at least one of the parameters is satisfied (e.g., the size of the command satisfies the threshold size, at least the threshold quantity of commands have at least the threshold size, the queue depth satisfies the threshold queue depth) the controller may switch the interface to a second gear (e.g., a second data transfer rate) and may communicate data with the memory system 110 according to the second gear. Alternatively, if the controller determines that each of the parameters fail to be satisfied, the controller may maintain the interface in the first gear. In some examples, the second gear may be higher than the first gear (e.g., correspond to a higher data transfer rate than the first gear). In this way, power savings may be achieved, as at least some data transfers may be executed at higher rates with lower latency, thereby allowing for earlier deactivation of various system components.

The system 100 may include any quantity of non-transitory computer readable media that support rate adjustments for a memory interface. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

Figure 2:
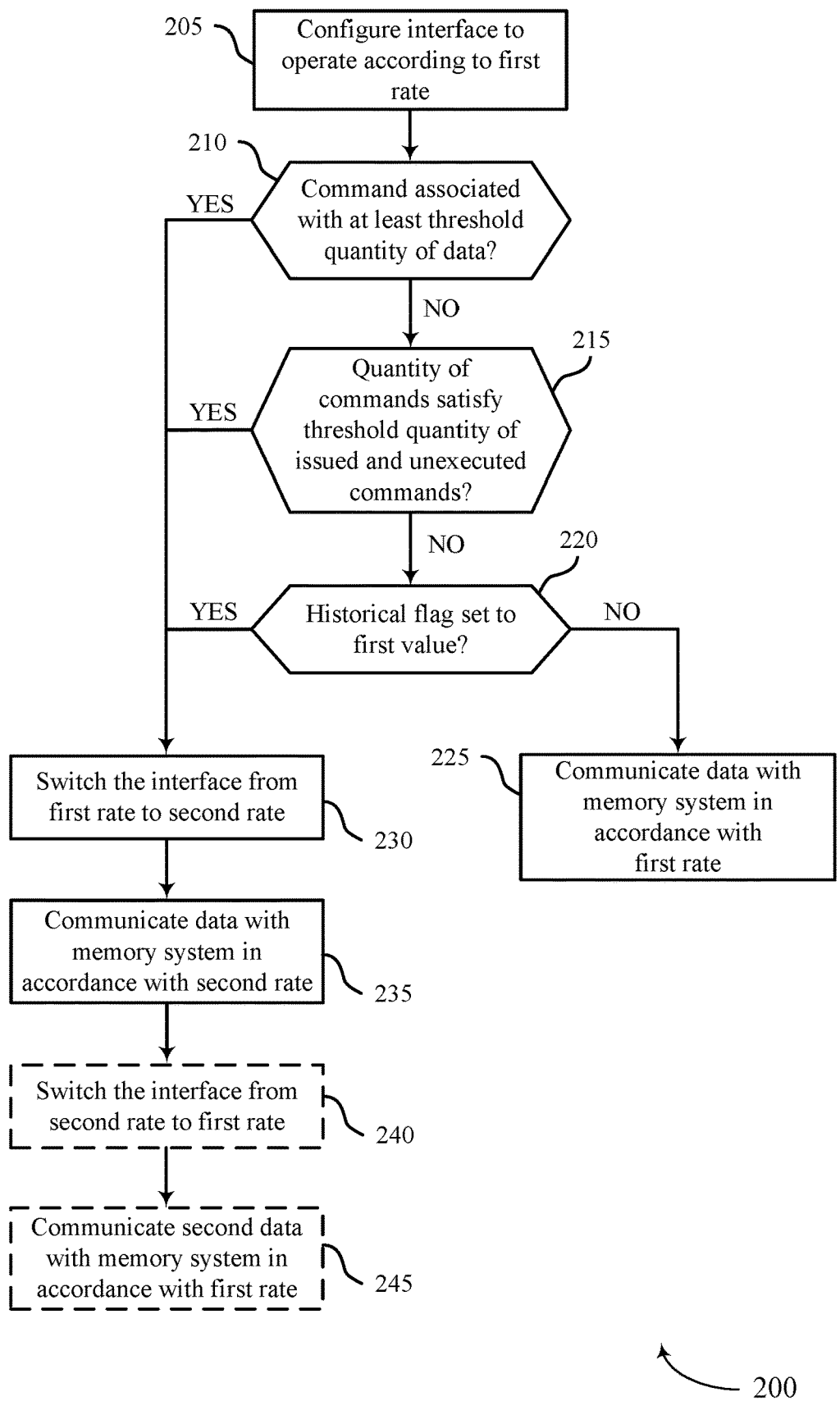
FIG. 2 illustrates an example of a process flow that supports rate adjustments for a memory interface in accordance with examples as disclosed herein.

FIG. 2 illustrates an example of a process flow 200 that supports rate adjustments for a memory interface in accordance with examples as disclosed herein. Process flow 200 may be performed by components of a host system, such as a host system 105 described with reference to FIG. 1, respectively. For example, process flow 200 may be performed by a controller of a host system such as a host system controller 106 as described with reference to FIG. 1. Process flow 200 may depict a process for selecting rates for data transfer that may be implemented to reduce latency, increase data rates, increase system performance, and reduce power consumption, among other benefits. Aspects of the process flow 200 may be implemented by a controller, among other components. Additionally or alternatively, aspects of the process flow 200 may be implemented as instructions stored in memory (e.g., firmware stored in a memory coupled with the host system controller 106). For example, the instructions, if executed by a controller (e.g., a host system controller 106), may cause the controller to perform the operations of the process flow 200.

In the following description of the process flow 200, the operations may be performed in different orders or at different times. Some operations may also be omitted from the process flow 200, and other operations may be added to the process flow 200.

At 205, an interface (e.g., a physical host interface) for communicating information between the controller and a memory system (e.g., a memory system 110 described with reference to FIG. 1) may be configured to operate according to a first rate of a set of rates (e.g., a first gear of a set of gears). For example, the controller (e.g., the host system controller 106) may configure the interface to operate according to the first rate. The first rate may correspond to a first data transfer rate between the controller and the memory system. In some examples, the controller may configure the interface to operate according to the first rate by issuing a DME command that writes the first rate (e.g., a value or index corresponding to the first rate) to a register that indicates the current rate of the interface.

In some examples, the set of rates may correspond to a burst mode (e.g., a high-speed mode) associated with the interface. For example, the controller may operate the interface in accordance with various operating modes, such as a low-speed mode and the burst mode, and each operating mode may be associated with multiple rates (e.g., gears). In some cases, the controller may initially configure the interface to operate according to the low-speed mode (e.g., after the host system is powered on or reset). The controller may switch the interface to operate according to the burst mode (e.g., during normal operation of the host system) and may (e.g., initially) select and configure the first rate for the interface. In some examples, the first rate may correspond to a relatively low data transfer rate (e.g., a relatively low gear) associated with the burst mode. For example, for the first rate may correspond to a minimum rate (e.g., a minimum gear) of the set of rates.

At 210, a command from the controller to the memory system may be evaluated as to whether it is associated with at least a threshold quantity of data. For example, the controller may determine whether a size of the command satisfies (e.g., is greater than, is greater than or equal to) a threshold size. The size of the command may correspond to a quantity of data to be communicated (e.g., transferred) based on the command (e.g., a quantity of data read from the memory system, a quantity of data written to the memory system). Accordingly, the controller may determine whether a quantity of data associated with (e.g., to be communicated in response to) the command satisfies a threshold quantity of data (e.g., 4 KB of data, or some other quantity of data). In some examples, the command may be an unissued command. In some examples, the command may correspond to a command that the controller may issue next.

If, at 210, the controller determines that the size of the command fails to satisfy the threshold size, the controller may perform 215. At 215, a quantity of issued and unexecuted commands from the controller to the memory system may be evaluated as to whether the quantity satisfies a threshold quantity of issued and unexecuted commands. For example, the controller may determine a queue depth of a queue of issued commands from the controller that remain unexecuted (e.g., by the memory system), where the queue depth corresponds to the quantity of commands included in the queue. The controller may determine whether the queue depth satisfies (e.g., is greater than, is greater than or equal to) a threshold queue depth. That is, the controller may determine whether the quantity of issued and unexecuted commands from the controller to the memory system satisfies a threshold quantity of issued and unexecuted commands. Additional details related to determining whether the threshold queue depth is satisfied are described with reference to FIG. 3B below.

If, at 215, the controller determines that queue depth fails to satisfy threshold queue depth, the controller may perform 220. At 220, a value of a historical flag (e.g., stored at the controller) may be evaluated. For example, the controller may determine whether the historical flag is set to a first value (e.g., a bit value of '1', a bit value of '0') indicating to operate the interface according to a second rate of the set of rates (e.g., a second gear of the set of gears). For instance, the controller may be configured to track a history associated with commands issued from the controller to the memory system (e.g., and executed by the memory system). To track the history, the controller may track a first quantity of issued (e.g., and executed) commands and may determine how many commands within the first quantity of issued commands have at least the threshold size. For example, the controller may determine (e.g., track) whether at least a threshold quantity of commands of the first quantity of issued commands are associated with at least the threshold quantity of data. That is, the controller may determine whether at least a threshold quantity of commands of the first quantity of issued commands have a size that satisfies (e.g., is greater than, is greater than or equal to) the threshold size.

If the first quantity of issued commands includes at least the threshold quantity of commands having at least the threshold size, the controller may set the historical flag to the first value. Alternatively, if the first quantity of issued commands fails to include at least the threshold quantity of commands having at least the threshold size, the controller may set the historical flag to a second value (e.g., a bit value of '0', a bit value of '1') indicating to operate the interface according to the first rate. In some examples, the controller may set the historical flag to the second value in response to an expiration of a timer associated with communication inactivity between the controller and the memory system. Accordingly, at 220, the controller may determine the value of the historical flag and whether the historical flag is set (e.g., was previously set by the controller) to the first value or the second value. Additional details related to setting the historical flag are described with reference to FIG. 3A below.

If, at 220, the controller determines that the historical flag is set to the second value, the controller may perform 225. At 225, data may be communicated between the controller and the memory system via the interface in accordance with the first rate. For example, the controller may refrain from switching the interface to the second rate in response to determining that the size of the command fails to satisfy the threshold size, the queue depth fails to satisfy the threshold queue depth, and that the historical flag is set to the second value (e.g., the first quantity of issued commands fails to include at least the threshold quantity of commands having at least the threshold size). For instance, the second rate may correspond to a relatively high data transfer rate (e.g., a relatively high gear) associated with the burst mode, such as a maximum rate of the set of rates (e.g., a maximum gear of the set of gears). The size of the command failing to satisfy the threshold size, the queue depth failing to satisfy the threshold queue depth, and the historical flag being set to the second value may indicate to the controller that a relatively small quantity of data (e.g., if any) is to be communicated between the controller and the memory system (e.g., in the near future, as a result of the currently issued and unexecuted commands, as a result of a next issued commands), or that a level of communication activity between the controller and the memory system may be relatively low. Thus, a high data transfer rate may be unnecessary to communicate any such data. Accordingly, to conserve power, the controller may maintain the configuration of the interface to operate according to the first rate and may communicate the data (e.g., if any) according to the first rate.

If, at 210, the controller determines that the size of the command satisfies the threshold size, the controller may perform 230 through 245 as follows. Additionally, or alternatively, if, at 215, the controller determines that the queue depth satisfies the threshold queue depth, the controller may perform 230 through 245 as follows. Additionally, or alternatively, if, at 220, the controller determines that the historical flag is set to the first value, the controller may perform 230 through 245 as follows. That is, if the controller determine that the size of the command satisfies the threshold size, the queue depth satisfies the threshold queue depth, the historical flag is set to the first value, or any combination thereof, the controller may perform 230 through 245 as follows.

At 230, the interface may be switched from the first rate to the second rate. For example, the controller may switch the interface from the first rate to the second rate in response to determining that the size of the command satisfies the threshold size, the queue depth satisfies the threshold queue depth, the historical flag is set to the first value, or any combination thereof. For instance, the size of the command satisfying the threshold size, the queue depth satisfying the threshold queue depth, and/or the historical flag being set to the first value may indicate to the controller that a relatively large quantity of data is to be communicated between the controller and the memory system (e.g., in the near future, as a result of the currently issued and unexecuted commands, as a result of a next issued commands) or that a level of communication activity between the controller and the memory system may be relatively high. Thus, a high data transfer rate may enable the controller and the memory system to communicate any data more quickly, thereby allowing for earlier deactivation of various system components and reducing power consumption. Accordingly, the controller may switch the interface from the first rate to the second rate that corresponds to a higher data transfer rate than the first rate (e.g., a maximum rate of the set of rates). In some examples, the controller may switch the interface from the first rate to the second rate by issuing a DME command that writes the second rate (e.g., a value or index corresponding to the second rate) to the register that indicates the current rate of the interface.

At 235, data may be communicated between the controller and the memory system in accordance with the second rate. For example, the controller may communicate the data with the memory system via the interface in accordance with the second rate based on switching the interface to the second rate.

At 240, the interface may be switched from the second rate to the first rate. For example, the controller may determine that a second set of one or more commands from the controller indicates for the controller to switch the interface from the second rate to the first rate. For instance, the controller may determine that a command of the second set (e.g., a next to be issued command) fails to satisfy the threshold size, that a queue depth associated with the second set fails to satisfy the threshold queue depth, and that the historical flag was set to the second value (e.g., based on the second set). Accordingly, the controller may switch the interface from the second rate to the first rate. In some examples, the controller may switch the interface from the second rate to the first rate by issuing a DME command that writes the first rate (e.g., the value or index corresponding to the first rate) to the register that indicates the current rate of the interface.

At 245, second data may (e.g., associated with the second set of one or more commands) be communicated between the controller and the memory system in accordance with the first rate. For example, the controller may communicate the second data with the memory system in accordance with the first rate as a result of switching the interface from the second rate to the first rate.

Figure 3A:
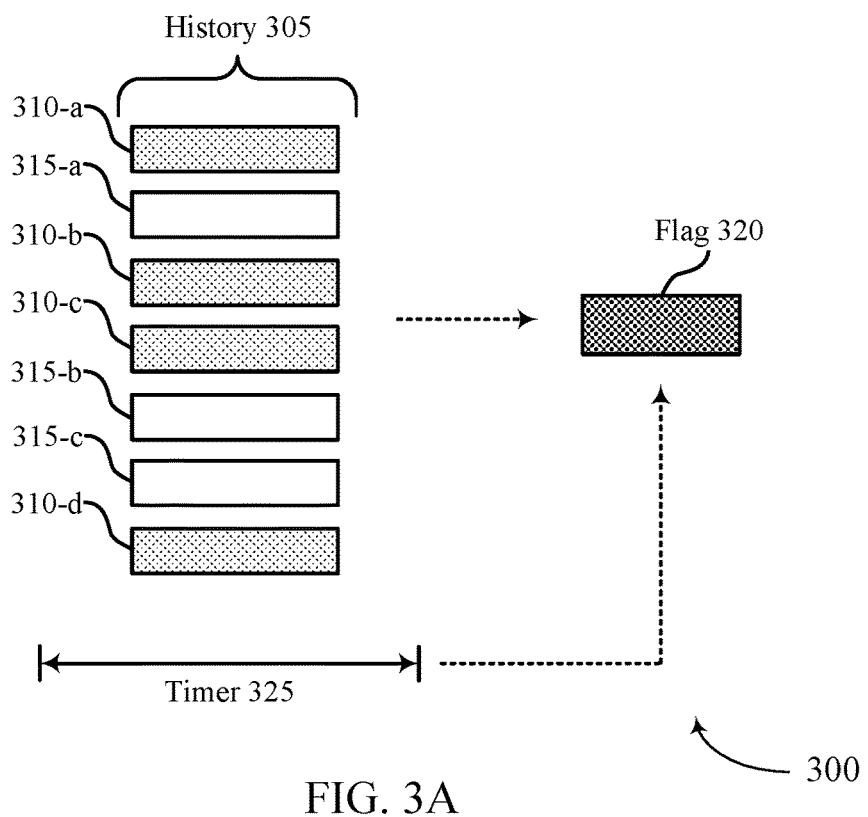
FIGS. 3A and 3B illustrate examples of parameter schemes that support rate adjustments for a memory interface in accordance with examples as disclosed herein.

FIG. 3A illustrates an example of a parameter scheme 300 that supports rate adjustments for a memory interface in accordance with examples as disclosed herein. The parameter scheme 300 may be implemented by components of a host system 105 as described with reference to FIG. 1. For example, the parameter scheme 300 may be implemented by a controller of a host system, such as a host system controller 106 as described with reference to FIG. 1. The parameter scheme 300 may be implemented by the controller to support data transfer rate selection schemes that may be implemented to reduce latency, increase data rates, increase system performance, and reduce power consumption, among other benefits.

The parameter scheme 300 depicts a history 305 that may indicate whether to set a value of a flag 320 to a first value or a second value. For example, the history 305 may correspond to a set of issued (e.g., and executed, unexecuted, or both) commands from the controller to a memory system that are tracked by the controller. In some examples, a quantity of commands included in the history 305 (e.g., tracked by the controller) may be indicated by a maxCommand parameter stored at the controller (e.g., in a register). In some cases, the controller may set a value of the maxCommand parameter (e.g., and may change the value of the maxCommand parameter at any time during operation). In some other cases, the value of the maxCommand parameter may be a defined value (e.g., a value programmed during manufacturing of the controller).

The history 305 may include commands 310 and/or commands 315. For example, the history may include a command 310-*a*, a command 310-*b*, a command 310-*c*, a command 310-*d*, a command 315-*a*, a command 315-*b*, and a command 315-*c*. The commands 310 may correspond to commands having respective sizes that satisfy (e.g., is greater than, is greater than or equal to) a threshold size. That is, the commands 310 may correspond to commands that cause at least a threshold quantity of data to be communicated between the controller and the memory system. The commands 315 may corresponds to commands having respective sizes that fail to satisfy the threshold size. It is noted that, for illustrative purposes, FIG. 3A depicts the history 305 as including both commands 310 and commands 315, however the principles disclosed herein may be adapted and applied for the history 305 to include any quantity of commands 310 and commands 315.

The controller may set the value of the flag based on a quantity of commands 310 included in the history 305. For example, the controller may be configured to track whether the quantity of commands 310 satisfies (e.g., is greater than, is greater than or equal to) a threshold quantity. If the controller determines that the quantity of commands 310 satisfies the threshold quantity, the controller may set the flag 320 to the first value (e.g., a bit value of '1', a bit value of '0'), where the first value indicates for an interface of the controller (e.g., a physical host interface) to be operated according to a first rate (e.g., of a burst mode). Alternatively, if the controller determines that the quantity of commands 310 fails to satisfy the threshold quantity, the controller may set the flag 320 to the second value (e.g., a bit value of '0', a bit value of '1'), where the second value indicates for the interface to be operated according to a second rate (e.g., of a burst mode). In some cases, the controller may configure the interface. In some examples, the first rate may correspond to a higher data transfer rate than the second rate. In some examples, the first rate may correspond to a maximum rate of the burst mode and the second rate may correspond to a minimum rate of the burst mode.

In some examples, a value of threshold quantity may be indicated by a perfCommand parameter stored at the controller (e.g., in the register). That is, the quantity of commands 310 included in the history 305 that cause the controller to set the flag 320 to the first value may be indicated by the perfCommand parameter. In some cases, the controller may set the value of the perfCommand parameter (e.g., and may change the value of the perfCommand parameter at any time during operation). In some other cases, the value of the perfCommand parameter may be a defined value (e.g., a value programmed during manufacturing of the controller).

In some examples, the controller may set the value of the flag 320 based on a timer 325 that is associated with communication inactivity between the controller and the memory system. For example, the timer 325 may run while no data is communicated between the controller and the memory system. Accordingly, an expiration of the timer 325 may indicate that no data was communicated between the controller and the memory system for at least the duration of the timer 325. In some examples, the interface may be in an idle state if no data is being actively communicated via the interface. In response to the expiration of the timer 325, the controller may set the flag 320 to the second value that indicates for the interface to be operated according to the second (e.g., lower) rate. In some cases, the controller may clear the commands 310 and the commands 315 included in the history 305 in response to the expiration of the timer 325 and may begin to track new commands issued after the expiration of the timer 325.

By tracking the history 305, the controller may reduce a frequency at which the rate of the interface is changed. For example, the history 305 may indicate how frequently commands 310 having at least the threshold size have been recently issued. A high frequency of commands 310 may indicate a greater likelihood that another command 310 will be issued. Accordingly, even if a size of a next issued command fails to satisfy a threshold size and a queue depth of a queue of issued and unexecuted commands fails to satisfy a threshold queue depth, the controller may maintain the interface at the first (e.g., higher) rate if at least a threshold quantity of commands 310 have recently been issued. This may result in reduced latency associated with switching the rate of the interface due to a reduced frequency of switching the rate of the interface, thereby increasing system performance.

Figure 3B:
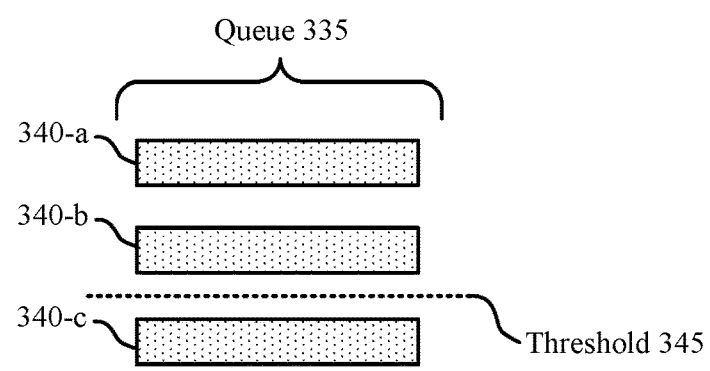

FIG. 3B illustrates an example of a parameter scheme 330 that supports rate adjustments for a memory interface in accordance with examples as disclosed herein. The parameter scheme 330 may be implemented by components of a host system 105 as described with reference to FIG. 1. For example, the parameter scheme 330 may be implemented by a controller of a host system, such as a host system controller 106 as described with reference to FIG. 1. The parameter scheme 330 may be implemented by the controller to support data transfer rate selection schemes that may be implemented to reduce latency, increase data rates, increase system performance, and reduce power consumption, among other benefits.

The parameter scheme 330 depicts a queue 335. The queue 335 may indicate whether an interface of the controller (e.g., a physical host interface) is to be operated according to a first rate (e.g., of a burst mode) that corresponds to a high (e.g., maximum) data transfer rate or a second rate (e.g., of the burst mode) that corresponds to a low (e.g., minimum) data transfer rate. For example, the controller may issue commands to a memory system prior to the completion (e.g., execution) of previously issued commands. Such issued commands may be included the queue 335 and may be executed as the memory system becomes available to perform the commands. For example, the queue 335 may include commands 340 that correspond to issued and unexecuted commands from the controller to the memory system. For instance, the queue 335 may include a command 340-a, a command 340-b, and a command 340-c that each correspond to an issued and unexecuted command (e.g., although any quantity of commands 340 included in the queue 335 is possible). In some examples, the quantity of commands 340 included in the queue 335 may be referred to as a queue depth of the queue 335.

The controller may determine whether the queue depth of the queue 335 satisfies (is greater than, is greater than or equal to) a threshold 345 and may determine a data transfer rate for the interface based on whether the threshold 345 is satisfied. For example, if the queue depth satisfies the threshold 345, the controller may set (e.g., switch) the interface to the first rate or may maintain the interface at the first rate (e.g., if the interface is currently set to the first rate). Alternatively, if the queue depth fails to satisfy the threshold 345, the controller may set (e.g., switch) the interface to the second rate or may maintain the interface at the second rate (e.g., if the interface is currently set to the second rate). In the example of FIG. 3B, the queue 335 may have a queue depth of three commands 340 and the threshold 345 may correspond to a queue depth of two commands 340. Accordingly, the controller may determine that the queue depth satisfies the threshold 345 and may set the interface to (e.g., or maintain the interface at) the first rate corresponding to the high (e.g., maximum) data transfer rate.

Figure 4:
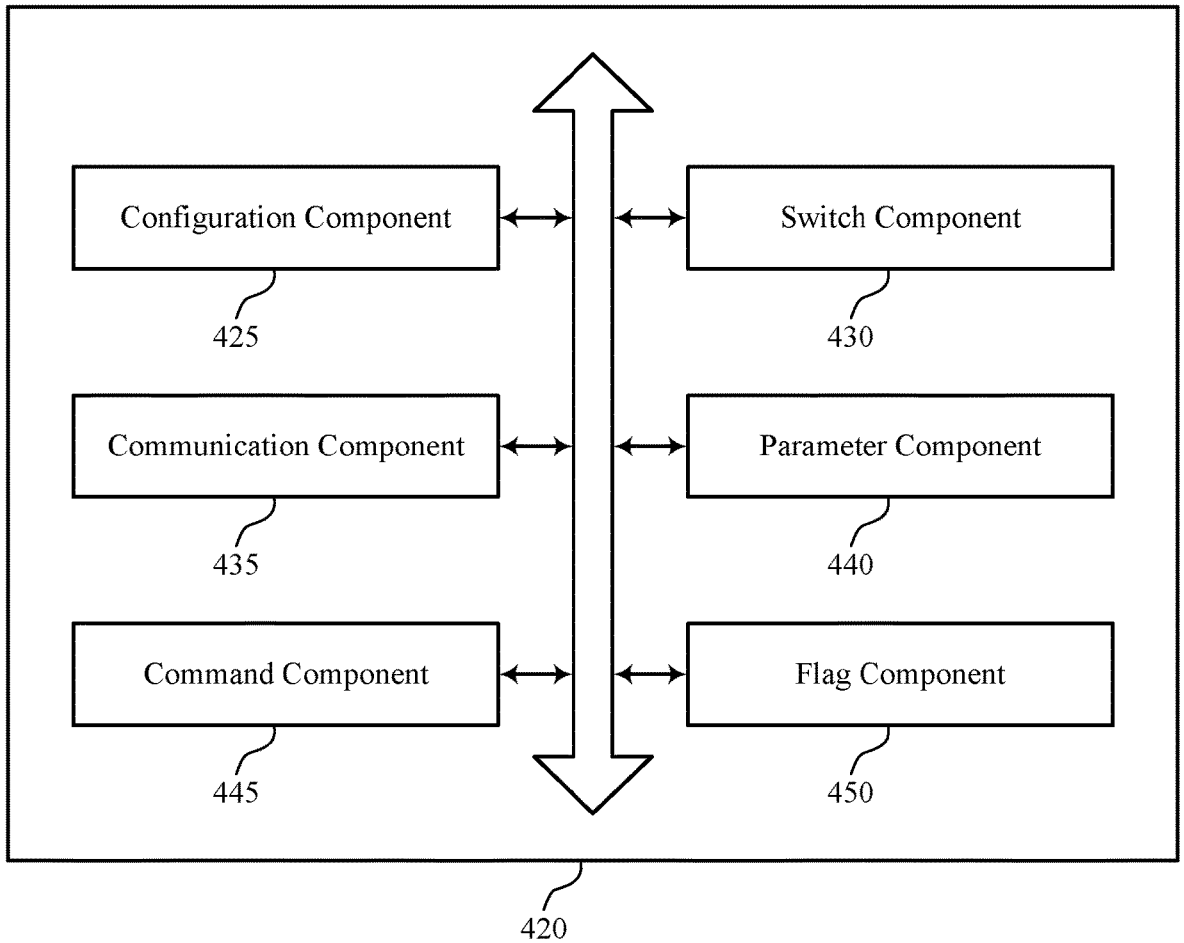
FIG. 4 shows a block diagram of a memory system that supports rate adjustments for a memory interface in accordance with examples as disclosed herein.

FIG. 4 shows a block diagram 400 of a host system 420 that supports rate adjustments for a memory interface in accordance with examples as disclosed herein. The host system 420 may be an example of aspects of a host system as described with reference to FIGS. 1 through 3. The host system 420, or various components thereof, may be an example of means for performing various aspects of rate adjustments for a memory interface as described herein. For example, the host system 420 may include a configuration component 425, a switch component 430, a communication component 435, a parameter component 440, a command component 445, a flag component 450, or any combination thereof. Each of these components may communicate, directly or indirectly, with one another (e.g., via one or more buses).

The configuration component 425 may be configured as or otherwise support a means for configuring an interface to operate according to a first rate, where the first rate is one of a set of rates that each correspond to a respective data transfer rate between a controller and a memory system via the interface. The switch component 430 may be configured as or otherwise support a means for switching the interface from the first rate to a second rate of the set of rates based at least in part on one or more commands from the controller to the memory system satisfying one or more parameters, the one or more parameters including a threshold quantity of data associated with a command, a threshold quantity of issued commands associated with at least the threshold quantity of data, a threshold quantity of issued and unexecuted commands, or any combination thereof. The communication component 435 may be configured as or otherwise support a means for communicating data with the memory system in accordance with the second rate.

In some examples, the parameter component 440 may be configured as or otherwise support a means for determining whether a first command of the one or more commands is associated with at least the threshold quantity of data, where switching the interface from the first rate to the second rate is based at least in part on determining that the first command is associated with at least the threshold quantity of data.

In some examples, the parameter component 440 may be configured as or otherwise support a means for determining whether a quantity of issued and unexecuted commands included in the one or more commands satisfies the threshold quantity of issued and unexecuted commands, where switching the interface from the first rate to the second rate is based at least in part on determining that the quantity of issued and unexecuted commands satisfies the threshold quantity of issued and unexecuted commands.

In some examples, the command component 445 may be configured as or otherwise support a means for tracking a first quantity of commands issued by the controller to the memory system, the first quantity of commands including the one or more commands. In some examples, the parameter component 440 may be configured as or otherwise support a means for determining whether the first quantity of commands includes at least the threshold quantity of issued commands associated with at least the threshold quantity of data, where switching the interface from the first rate to the second rate is based at least in part on determining that the first quantity of commands includes at least the threshold quantity of issued commands associated with at least the threshold quantity of data.

In some examples, the flag component 450 may be configured as or otherwise support a means for setting a flag to a first value based at least in part on determining that the first quantity of commands includes at least the threshold quantity of issued commands associated with at least the threshold quantity of data, the first value indicating to operate the interface according to the second rate, where switching the interface from the first rate to the second rate is based at least in part on setting the flag to the first value.

In some examples, the flag component 450 may be configured as or otherwise support a means for setting the flag to a second value, after setting the flag to the first value, based at least in part on an expiration of a timer associated with communication inactivity between the controller and the memory system, the second value indicating to operate the interface according to the first rate.

In some examples, the flag component 450 may be configured as or otherwise support a means for setting the flag to a second value, after setting the flag to the first value, based at least in part on a second quantity of commands issued by the controller to the memory system and tracked by the host system failing to include at least the threshold quantity of issued commands associated with at least the threshold quantity of data, the second value indicating to operate the interface according to the first rate.

In some examples, the first rate corresponds to a first data transfer rate and the second rate corresponds to a second data transfer rate, the second data transfer rate higher than the first data transfer rate.

In some examples, the first rate corresponds to a minimum rate of the set of rates and the second rate corresponds to a maximum rate of the set of rates.

In some examples, the switch component 430 may be configured as or otherwise support a means for switching the interface from the second rate to the first rate based at least in part on a second set of commands from the controller failing to satisfy each of the one or more parameters. In some examples, the communication component 435 may be configured as or otherwise support a means for communicating second data with the memory system in accordance with the first rate.

In some examples, the one or more parameters are each included in a set of parameters. In some examples, the switch component 430 may be configured as or otherwise support a means for switching the interface from the first rate to the second rate based at least in part on the one or more commands satisfying any parameter of the set of parameters.

In some examples, the set of rates corresponds to a burst mode associated with the interface, the burst mode different from a low-speed mode associated with the interface, and the burst mode associated with higher data transfer rates than the low-speed mode.

Figure 5:
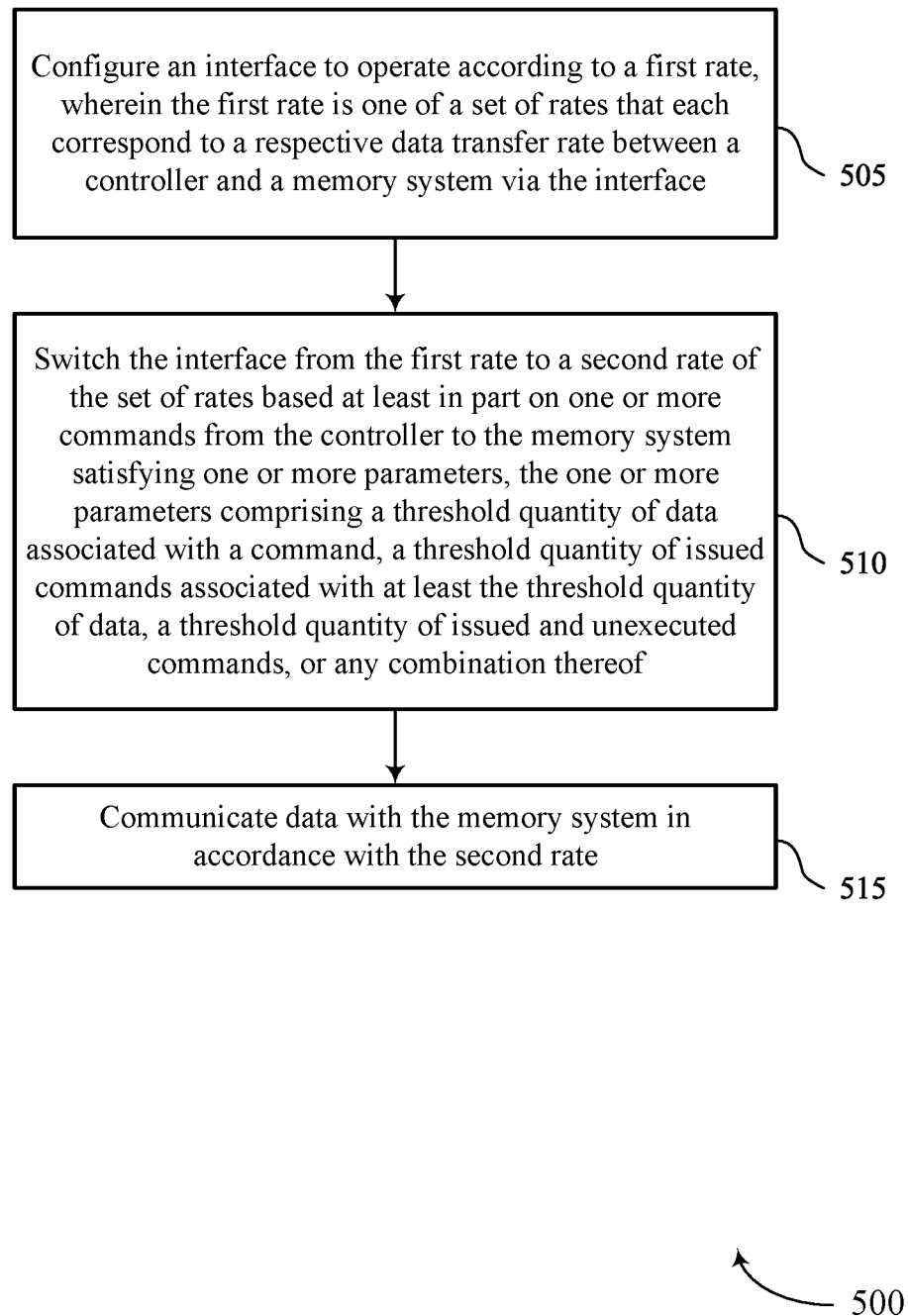
FIG. 5 shows a flowchart illustrating a method or methods that support rate adjustments for a memory interface in accordance with examples as disclosed herein.

FIG. 5 shows a flowchart illustrating a method 500 that supports rate adjustments for a memory interface in accordance with examples as disclosed herein. The operations of method 500 may be implemented by a host system or its components as described herein. For example, the operations of method 500 may be performed by a host system as described with reference to FIGS. 1 through 4. In some examples, a host system may execute a set of instructions to control the functional elements of the device to perform the described functions. Additionally or alternatively, the host system may perform aspects of the described functions using special-purpose hardware.

At 505, the method may include configuring an interface to operate according to a first rate, where the first rate is one of a set of rates that each correspond to a respective data transfer rate between a controller and a memory system via the interface. The operations of 505 may be performed in accordance with examples as disclosed herein. In some examples, aspects of the operations of 505 may be performed by a configuration component 425 as described with reference to FIG. 4.

At 510, the method may include switching the interface from the first rate to a second rate of the set of rates based at least in part on one or more commands from the controller to the memory system satisfying one or more parameters, the one or more parameters including a threshold quantity of data associated with a command, a threshold quantity of issued commands associated with at least the threshold quantity of data, a threshold quantity of issued and unexecuted commands, or any combination thereof. The operations of 510 may be performed in accordance with examples as disclosed herein. In some examples, aspects of the operations of 510 may be performed by a switch component 430 as described with reference to FIG. 4.

At 515, the method may include communicating data with the memory system in accordance with the second rate. The operations of 515 may be performed in accordance with examples as disclosed herein. In some examples, aspects of the operations of 515 may be performed by a communication component 435 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for configuring an interface to operate according to a first rate, where the first rate is one of a set of rates that each correspond to a respective data transfer rate between a controller and a memory system via the interface, switching the interface from the first rate to a second rate of the set of rates based at least in part on one or more commands from the controller to the memory system satisfying one or more parameters, the one or more parameters including a threshold quantity of data associated with a command, a threshold quantity of issued commands associated with at least the threshold quantity of data, a threshold quantity of issued and unexecuted commands, or any combination thereof, and communicating data with the memory system in accordance with the second rate.

Some examples of the method 500 and the apparatus described herein may further include operations, features, circuitry, logic, means, or instructions for determining whether a first command of the one or more commands may be associated with at least the threshold quantity of data, where switching the interface from the first rate to the second rate may be based at least in part on determining that the first command may be associated with at least the threshold quantity of data.

Some examples of the method 500 and the apparatus described herein may further include operations, features, circuitry, logic, means, or instructions for determining whether a quantity of issued and unexecuted commands included in the one or more commands satisfies the threshold quantity of issued and unexecuted commands, where switching the interface from the first rate to the second rate may be based at least in part on determining that the quantity of issued and unexecuted commands satisfies the threshold quantity of issued and unexecuted commands.

Some examples of the method 500 and the apparatus described herein may further include operations, features, circuitry, logic, means, or instructions for tracking a first quantity of commands issued by the controller to the memory system, the first quantity of commands including the one or more commands and determining whether the first quantity of commands includes at least the threshold quantity of issued commands associated with at least the threshold quantity of data, where switching the interface from the first rate to the second rate may be based at least in part on determining that the first quantity of commands includes at least the threshold quantity of issued commands associated with at least the threshold quantity of data.

Some examples of the method 500 and the apparatus described herein may further include operations, features, circuitry, logic, means, or instructions for setting a flag to a first value based at least in part on determining that the first quantity of commands includes at least the threshold quantity of issued commands associated with at least the threshold quantity of data, the first value indicating to operate the interface according to the second rate, where switching the interface from the first rate to the second rate may be based at least in part on setting the flag to the first value.

Some examples of the method 500 and the apparatus described herein may further include operations, features, circuitry, logic, means, or instructions for setting the flag to a second value, after setting the flag to the first value, based at least in part on an expiration of a timer associated with communication inactivity between the controller and the memory system, the second value indicating to operate the interface according to the first rate.

Some examples of the method 500 and the apparatus described herein may further include operations, features, circuitry, logic, means, or instructions for setting the flag to a second value, after setting the flag to the first value, based at least in part on a second quantity of commands issued by the controller to the memory system and tracked by the apparatus failing to include at least the threshold quantity of issued commands associated with at least the threshold quantity of data, the second value indicating to operate the interface according to the first rate.

In some examples of the method 500 and the apparatus described herein, the first rate corresponds to a first data transfer rate and the second rate corresponds to a second data transfer rate, the second data transfer rate higher than the first data transfer rate.

In some examples of the method 500 and the apparatus described herein, the first rate corresponds to a minimum rate of the set of rates and the second rate corresponds to a maximum rate of the set of rates.

Some examples of the method 500 and the apparatus described herein may further include operations, features, circuitry, logic, means, or instructions for switching the interface from the second rate to the first rate based at least in part on a second set of commands from the controller failing to satisfy each of the one or more parameters and communicating second data with the memory system in accordance with the first rate.

In some examples of the method 500 and the apparatus described herein, the one or more parameters may be each included in a set of parameters. Some examples of the method 500 and the apparatus described herein may further include operations, features, circuitry, logic, means, or instructions for switching the interface from the first rate to the second rate based at least in part on the one or more commands satisfying any parameter of the set of parameters.

In some examples of the method 500 and the apparatus described herein, the set of rates corresponds to a burst mode associated with the interface, the burst mode different from a low-speed mode associated with the interface, and the burst mode associated with higher data transfer rates than the low-speed mode.

It should be noted that the methods described above describe possible implementations, and that the operations and the steps may be rearranged or otherwise modified and that other implementations are possible. Further, portions from two or more of the methods may be combined.

An apparatus is described. The apparatus may include a controller configured to communicate with a memory system via an interface, where the controller is configured to cause the apparatus to configure the interface to operate according to a first rate, where the first rate is one of a set of rates that each correspond to a respective data transfer rate between the controller and the memory system via the interface, switch the interface from the first rate to a second rate of the set of rates based at least in part on one or more commands from the controller to the memory system satisfying one or more parameters, the one or more parameters including a threshold quantity of data associated with a command, a threshold quantity of issued commands associated with at least the threshold quantity of data, a threshold quantity of issued and unexecuted commands, or any combination thereof, and communicate data with the memory system in accordance with the second rate.

In some examples of the apparatus, the controller may be further configured to cause the apparatus to determine whether a first command of the one or more commands may be associated with at least the threshold quantity of data, where switching the interface from the first rate to the second rate may be based at least in part on determining that the first command may be associated with at least the threshold quantity of data.

In some examples of the apparatus, the controller may be further configured to cause the apparatus to determine whether a quantity of issued and unexecuted commands included in the one or more commands satisfies the threshold quantity of issued and unexecuted commands, where switching the interface from the first rate to the second rate may be based at least in part on determining that the quantity of issued and unexecuted commands satisfies the threshold quantity of issued and unexecuted commands.

In some examples of the apparatus, the controller may be further configured to cause the apparatus to track a first quantity of commands issued by the controller to the memory system, the first quantity of commands including the one or more commands and determine whether the first quantity of commands includes at least the threshold quantity of issued commands associated with at least the threshold quantity of data, where switching the interface from the first rate to the second rate may be based at least in part on determining that the first quantity of commands includes at least the threshold quantity of issued commands associated with at least the threshold quantity of data.

In some examples of the apparatus, the controller may be further configured to cause the apparatus to set a flag to a first value based at least in part on determining that the first quantity of commands includes at least the threshold quantity of issued commands associated with at least the threshold quantity of data, the first value indicating to operate the interface according to the second rate, where switching the interface from the first rate to the second rate may be based at least in part on setting the flag to the first value.

In some examples of the apparatus, the controller may be further configured to cause the apparatus to set the flag to a second value, after setting the flag to the first value, based at least in part on an expiration of a timer associated with communication inactivity between the controller and the memory system, the second value indicating to operate the interface according to the first rate.

In some examples of the apparatus, the controller may be further configured to cause the apparatus to set the flag to a second value, after setting the flag to the first value, based at least in part on a second quantity of commands issued by the controller to the memory system and tracked by the apparatus failing to include at least the threshold quantity of issued commands associated with at least the threshold quantity of data, the second value indicating to operate the interface according to the first rate.

In some examples of the apparatus, the first rate corresponds to a first data transfer rate and the second rate corresponds to a second data transfer rate, the second data transfer rate higher than the first data transfer rate.

In some examples of the apparatus, the first rate corresponds to a minimum rate of the set of rates and the second rate corresponds to a maximum rate of the set of rates.

In some examples of the apparatus, the controller may be further configured to cause the apparatus to switch the interface from the second rate to the first rate based at least in part on a second set of commands from the controller failing to satisfy each of the one or more parameters and communicate second data with the memory system in accordance with the first rate.

In some examples of the apparatus, the one or more parameters may be each included in a set of parameters and the controller may be configured to cause the apparatus to switch the interface from the first rate to the second rate based at least in part on the one or more commands satisfying any parameter of the set of parameters.

In some examples of the apparatus, the set of rates corresponds to a burst mode associated with the interface, the burst mode different from a low-speed mode associated with the interface, and the burst mode associated with higher data transfer rates than the low-speed mode.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and a second condition or action may occur directly as a result of the previous condition or action occurring independent of whether other conditions or actions occur. In some examples, a first condition or action may be performed, and a second condition or action may occur directly as a result of the previous condition or action occurring, such that no other intermediate conditions or actions occur between the earlier condition or action and the second condition or action, or such that or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily doped, e.g., degenerate, semiconductor region. The source and drain may be separated by a lightly doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
one or more controllers configured to communicate with a memory system via an interface, wherein the one or more controllers are configured to cause the apparatus to:
configure the interface to operate according to a first rate, wherein the first rate is one of a set of rates that each correspond to a respective data transfer rate between the one or more controllers and the memory system via the interface;
determine, during a duration, whether a threshold quantity of commands issued from the one or more controllers to the memory system satisfies one or more parameters, wherein the one or more parameters comprises a threshold quantity of issued commands associated with at least a threshold quantity of data, a threshold quantity of issued and unexecuted commands, or any combination thereof, wherein the threshold quantity is greater than one;
set, in accordance with the duration, a value of a flag based at least in part on whether the threshold quantity of commands issued from the one or more controllers to the memory system satisfy the one or more parameters, wherein a first value of the flag is based on the one or more parameters being satisfied and a second value of the flag is based on the one or more parameters failing to be satisfied;

switch the interface from the first rate to a second rate of the set of rates based at least in part on setting the value of the flag to the first value;

communicate data with the memory system in accordance with the second rate; and set the flag to the second value, after setting the flag to the first value, based at least in part on an expiration of a timer associated with communication inactivity between the one or more controllers and the memory system, the second value indicating to operate the interface according to the first rate.

2. The apparatus of claim 1, wherein the one or more controllers are further configured to cause the apparatus to:

determine whether a first command of the threshold quantity of commands is associated with at least the threshold quantity of data, wherein setting the value of the flag to the first value is based at least in part on determining that the first command is associated with at least the threshold quantity of data.

3. The apparatus of claim 1, wherein the one or more controllers are further configured to cause the apparatus to:

determine whether a quantity of issued and unexecuted commands included in the threshold quantity of commands satisfies the threshold quantity of issued and unexecuted commands, wherein setting the value of the flag to the first value is based at least in part on determining that the quantity of issued and unexecuted commands satisfies the threshold quantity of issued and unexecuted commands.

4. The apparatus of claim 1, wherein the one or more controllers are further configured to cause the apparatus to:

track a first quantity of commands issued by the one or more controllers to the memory system, the first quantity of commands comprising the threshold quantity of commands; and determine whether the first quantity of commands includes at least the threshold quantity of issued commands associated with at least the threshold quantity of data, wherein setting the value of the flag to the first value is based at least in part on determining that the first quantity of commands includes at least the threshold quantity of issued commands associated with at least the threshold quantity of data.

5. The apparatus of claim 1, wherein the first rate corresponds to a first data transfer rate and the second rate corresponds to a second data transfer rate, the second data transfer rate higher than the first data transfer rate.

6. The apparatus of claim 1, wherein the first rate corresponds to a minimum rate of the set of rates and the second rate corresponds to a maximum rate of the set of rates.

7. The apparatus of claim 1, wherein the one or more controllers are further configured to cause the apparatus to:

switch the interface from the second rate to the first rate based at least in part on setting the value of the flag to the second value; and communicate second data with the memory system in accordance with the first rate.

8. The apparatus of claim 1, wherein:

the one or more parameters are each included in a set of parameters; and the one or more controllers are configured to cause the apparatus to set the value of the flag to the first value based at least in part on the threshold quantity of commands satisfying any parameter of the set of parameters.

9. The apparatus of claim 1, wherein the set of rates corresponds to a burst mode associated with the interface, the burst mode different from a low-speed mode associated with the interface, and the burst mode associated with higher data transfer rates than the low-speed mode.

10. An apparatus, comprising:

one or more controllers configured to communicate with a memory system via an interface, wherein the one or more controllers are configured to cause the apparatus to:

configure the interface to operate according to a first rate, wherein the first rate is one of a set of rates that each correspond to a respective data transfer rate between the one or more controllers and the memory system via the interface;

switch the interface from the first rate to a second rate of the set of rates based at least in part on one or more commands from the one or more controllers to the memory system satisfying one or more parameters, the one or more parameters comprising a threshold quantity of data associated with a command, a threshold quantity of issued commands associated with at least the threshold quantity of data, a threshold quantity of issued and unexecuted commands, or any combination thereof, communicate data with the memory system in accordance with the second rate;

track a first quantity of commands issued by the one or more controllers to the memory system, the first quantity of commands comprising one or more commands;

determine whether the first quantity of commands includes at least the threshold quantity of issued commands associated with at least the threshold quantity of data, wherein switching an interface from the first rate to the second rate is based at least in part on determining that the first quantity of commands includes at least the threshold quantity of issued commands associated with at least the threshold quantity of data;

set a flag to a first value based at least in part on determining that the first quantity of commands includes at least the threshold quantity of issued commands associated with at least the threshold quantity of data, the first value indicating to operate the interface according to the second rate, wherein switching the interface from the first rate to the second rate is based at least in part on setting the flag to the first value; and set the flag to a second value, after setting the flag to the first value, based at least in part on an expiration of a timer associated with communication inactivity between the one or more controllers and the memory system, the second value indicating to operate the interface according to the first rate.

11. A non-transitory computer-readable medium storing code comprising instructions which, when executed by one or more processors of an electronic device, cause the electronic device to:

configure an interface to operate according to a first rate, wherein the first rate is one of a set of rates that each correspond to a respective data transfer rate between a controller and a memory system via the interface;

determine, during a duration, whether a threshold quantity of commands issued from the controller to the memory system satisfies one or more parameters, wherein the one or more parameters comprises a threshold quantity of issued commands associated with at least a threshold quantity of data, a threshold quantity of issued and unexecuted commands, or any combination thereof, wherein the threshold quantity is greater than one;

set, in accordance with the duration, a value of a flag based at least in part on whether the threshold quantity of commands issued from the controller to the memory system satisfy the one or more parameters, wherein a first value of the flag is based on the one or more parameters being satisfied and a second value of the flag is based on the one or more parameters failing to be satisfied;

switch the interface from the first rate to a second rate of the set of rates based at least in part on setting the value of the flag to the first value;

communicate data with the memory system in accordance with the second rate; and set the flag to the second value, after setting the flag to the first value, based at least in part on an expiration of a timer associated with communication inactivity between one or more controllers and the memory system, the second value indicating to operate the interface according to the first rate.

12. The non-transitory computer-readable medium of claim 11, wherein, the instructions, when executed by the one or more processors of the electronic device, further cause the electronic device to:

determine whether a first command of the threshold quantity of commands is associated with at least the threshold quantity of data, wherein setting the value of the flag to the first value is based at least in part on determining that the first command is associated with at least the threshold quantity of data.

13. The non-transitory computer-readable medium of claim 11, wherein, the instructions, when executed by the one or more processors of the electronic device, further cause the electronic device to:

determine whether a quantity of issued and unexecuted commands included in the threshold quantity of commands satisfies the threshold quantity of issued and unexecuted commands, wherein setting the value of the flag to the first value is based at least in part on determining that the quantity of issued and unexecuted commands satisfies the threshold quantity of issued and unexecuted commands.

14. The non-transitory computer-readable medium of claim 11, wherein, the instructions, when executed by the one or more processors of the electronic device, further cause the electronic device to:

track a first quantity of commands issued by the controller to the memory system, the first quantity of commands comprising the threshold quantity of commands; and determine whether the first quantity of commands includes at least the threshold quantity of issued commands associated with at least the threshold quantity of data, wherein setting the value of the flag to the first value is based at least in part on determining that the first quantity of commands includes at least the threshold quantity of issued commands associated with at least the threshold quantity of data.

15. The non-transitory computer-readable medium of claim 14, wherein, the instructions, when executed by the one or more processors of the electronic device, further cause the electronic device to:

set the value of the flag to the first value based at least in part on determining that the first quantity of commands includes at least the threshold quantity of issued commands associated with at least the threshold quantity of data, the first value indicating to operate the interface according to the second rate; and set the value of the flag to the second value, after setting the value of the flag to the first value, based at least in part on a second quantity of commands issued by the controller to the memory system and tracked by the electronic device to include at least the threshold quantity of issued commands associated with at least the threshold quantity of data, the second value indicating to operate the interface according to the first rate.

16. A method, comprising:

configuring an interface to operate according to a first rate, wherein the first rate is one of a set of rates that each correspond to a respective data transfer rate between a controller and a memory system via the interface;

determining, during a duration, whether a threshold quantity of commands issued from the controller to the memory system satisfies one or more parameters, wherein the one or more parameters comprises a threshold quantity of issued commands associated with at least a threshold quantity of data, a threshold quantity of issued and unexecuted commands, or any combination thereof, wherein the threshold quantity is greater than one;

setting, in accordance with the duration, a value of a flag based at least in part on whether the threshold quantity of commands issued from the controller to the memory system satisfy the one or more parameters, wherein a first value of the flag is based on the one or more parameters being satisfied and a second value of the flag is based on the one or more parameters failing to be satisfied;

switching the interface from the first rate to a second rate of the set of rates based at least in part on setting the value of the flag to the first value;

communicating data with the memory system in accordance with the second rate; and set the flag to the second value, after setting the flag to the first value, based at least in part on an expiration of a timer associated with communication inactivity between one or more controllers and the memory system, the second value indicating to operate the interface according to the first rate.

17. The method of claim 16, further comprising:

determining whether a first command of the threshold quantity of commands is associated with at least the threshold quantity of data, wherein setting the value of the flag to the first value is based at least in part on determining that the first command is associated with at least the threshold quantity of data.

18. The method of claim 16, further comprising:

determine whether a quantity of issued and unexecuted commands included in the threshold quantity of commands satisfies the threshold quantity of issued and unexecuted commands, wherein setting the value of the flag to the first value is based at least in part on determining that the quantity of issued and unexecuted commands satisfies the threshold quantity of issued and unexecuted commands.

* * * * *